Patented Nov. 10, 1953

2,658,831

UNITED STATES PATENT OFFICE 2,658,831

BASE MATERIALS FOR FROZEN DESSERTS

Jacob R. Katz, University City, Mo.

No Drawing. Application August 29, 1952,
Serial No. 307,164

8 Claims. (Cl. 99—136)

This invention relates to certain new and useful improvements in base materials for frozen desserts.

Ice cream, when manufactured according to standard methods, usually contains sucrose, butter fat, serum solids (milk solids non-fat), and water, and according to most statutory regulations in the various States and municipalities it is necessary that the butter fat content be at least 8% to 12%. The cost of butter fat has steadily increased in recent years and the price of ice cream has correspondingly risen. It is, therefore, becoming increasingly desirable to provide some type of base material which can be utilized for making frozen desserts having the texture, taste, and appearance of ice cream without the utilization of butter fat. Numerous formulas have been developed employing various types of edible oils and shortenings as butter fat substitutes, but these materials very quickly develop off-flavors or possess distinctive initial flavors which can be detected in the final product. Furthermore, these butter fat substitutes do not produce a product having a desirable texture and are, at best, difficult to incorporate into a frozen dessert.

It is, therefore, the primary object of the present invention to provide a base material for making frozen desserts, which base material is much less expensive than butter fat and which, nevertheless, produces a frozen dessert which is smooth in texture and has the taste and appearance of high quality ice cream.

It is another object of the present invention to provide a base material for making a frozen dessert, which base material is simple and convenient to manufacture, ship, and can be readily compounded with flavor and the necessary aqueous ingredients to make a frozen dessert mix capable of being immediately frozen by the same methods as those usually employed in freezing ice cream.

It is a further object of the present invention to provide a base material for making a frozen dessert, which base material is capable of being shipped or stored at room temperatures for relatively long periods of time without any danger of deterioration, rancidity, or the development of off-flavors.

With the above and other objects in view, my invention resides in the novel processes and compositions of matter presently described and pointed out in the claims.

Broadly speaking, the present invention resides in the combination of plain or hydrogenated oils, such as cocoanut oil, cottonseed oil, soya oil, peanut oil, and similar vegetable oils, which have been highly refined and have a very bland taste, with sugar, dried corn syrup, natural vanilla flavor, glyceryl monostearate, sodium citrate, sodium phosphate, a small quantity of magnesium hydroxide, and an anti-oxidant such as propyl 3,4,5-trihydroxy benzoate. It has been found important to use pure natural vanilla flavor which may, if desired, be fortified with vanillin or ethyl vanillate, but it is important to avoid the use of any flavors containing coumarin or coumarin derivatives since these latter materials produce an undesirable flavor when blended with the oils above mentioned.

The ingredients are heated, thoroughly mixed, and finally whipped to incorporate into the mixture a large quantity of air in the form of very finely divided, uniformly dispersed bubbles until the product has a specific gravity substantially less than 1. In this form, the material becomes a firm paste while warm and upon cooling becomes solid. Thus, while warm, it can be formed into large thick slabs of any suitable size and shape or in any other physical form convenient for shipping, transportation and handling. The resultant slabs can, thereupon, when cool, be wrapped in wax paper, foil or any other suitable packaging means and can be stored or shipped at ordinary temperatures without any damage or deterioration.

A frozen dessert can be manufactured from this base material by simply forming a suitable mixture of water, flavoring, and milk solids non-fat. When this mixture has been thoroughly stirred to a uniform consistency, a proper amount of the base material in slab form is added. The base material will float on the top of the aqueous solution and, upon continued agitation, will be gradually incorporated therein, producing a smooth frozen dessert mix which can be fed directly into the homogenizer, thence to a cooler, and finally to the freezer.

The following are illustrations of preferred formulae which may be employed in making the base material according to the present invention:

Example I

| Ingredient | Unit | Amount |
|---|---|---|
| Hydrogenated cocoanut oil | lbs | 63 |
| Plain cottonseed oil (highly refined, bland) | lbs | 63 |
| Propyl 3,4,5-trihydroxy benzoate | oz | 1¼ |
| Sugar | lbs | 100 |
| Dried corn syrup | lbs | 55 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

Example II

| Ingredient | Unit | Amount |
|---|---|---|
| Plain cocoanut oil | lbs | 45 |
| Hydrogenated cottonseed oil | lbs | 45 |
| Propyl 3,4,5-trihydroxy benzoate | oz | 8 |
| Sugar | lbs | 100 |
| Dried corn syrup | lbs | 55 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

Example III

| Ingredient | Unit | Amount |
|---|---|---|
| Hydrogenated cocoanut oil | lbs | 126 |
| Propyl 3,4,5-trihydroxy benzoate | oz | 1¼ |
| Sugar | lbs | 100 |
| Dried corn syrup | lbs | 55 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

Example IV

| Ingredient | Unit | Amount |
|---|---|---|
| Plain cocoanut oil | lbs | 54 |
| Propyl 3,4,5-trihydroxy benzoate | oz | ½ |
| Sugar | lbs | 90 |
| Dried corn syrup | lbs | 63 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

The following are illustrations of preferred formulae which may be employed in making a frozen dessert from the base material of the present invention:

(A)

| Ingredient | Unit | Amount |
|---|---|---|
| Water | gals | 37½ |
| Skimmed condensed milk (30% serium solids) | gals | 32½ |
| Base material (as per Example I) | lbs | 285 |

(B)

| Ingredient | Unit | Amount |
|---|---|---|
| Skimmed condensed milk | gals | 39 |
| Water | gals | 34½ |
| Base material (as per Example II) | lbs | 250 |

It should be understood that changes in the methods, compositions, and combinations above set forth may be made without departing from the nature and principle of my invention.

Having thus described my invention, what I claim and desire to secure by Letters Patent is:

1. A base material for making frozen confections, said base material being capable of floating on water and being in the form of a solid aerated slab containing a bland tasting edible oil, sugar, propyl 3,4,5-trihydroxy benzoate, and locust bean gum.

2. A base material for making frozen confections, said base material being capable of floating on water and being in the form of a solid aerated slab containing hydrogenated cocoanut oil, plain cottonseed oil, sugar, propyl 3,4,5-trihydroxy benzoate, and locust bean gum.

3. A base material for making frozen confections, said base material being capable of floating on water and consisting essentially of the following ingredients in the following relative proportions:

| Ingredient | Unit | Amount |
|---|---|---|
| Hydrogenated cocoanut oil | lbs | 63 |
| Plain cottonseed oil (highly refined, bland) | lbs | 63 |
| Propyl 3,4,5-trihydroxy benzoate | oz | 1¼ |
| Sugar | lbs | 100 |
| Dried corn syrup | lbs | 55 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

4. A base material for making frozen confections, said base material being capable of floating on water and consisting essentially of the following ingredients in the following relative proportions:

| Ingredient | Unit | Amount |
|---|---|---|
| Plain cocoanut oil | lbs | 45 |
| Hydrogenated cottonseed oil | lbs | 45 |
| Propyl 3,4,5-trihydroxy benzoate | oz | 8 |
| Sugar | lbs | 100 |
| Dried corn syrup | lbs | 55 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

5. A base material for making frozen confections, said base material being capable of floating on water and consisting essentially of the following ingredients in the following relative proportions:

| Ingredient | Unit | Amount |
|---|---|---|
| Hydrogenated cocoanut oil | lbs | 126 |
| Propyl 3,4,5-trihydroxy benzoate | oz | 1¼ |
| Sugar | lbs | 100 |
| Dried corn syrup | lbs | 55 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

6. A base material for making frozen confections, said base material being capable of floating on water and consisting essentially of the following ingredients in the following relative proportions:

| Ingredient | Unit | Amount |
|---|---|---|
| Plain cocoanut oil | lbs | 54 |
| Propyl 3,4,5-trihydroxy benzoate | oz | ½ |
| Sugar | lbs | 90 |
| Dried corn syrup | lbs | 63 |
| Natural vanilla flavoring | oz | 10 |
| Glyceryl monostearate | oz | 7 |
| Sodium phosphate | oz | ½ |
| Sodium citrate | oz | ½ |
| Magnesium hydroxide | oz | 2 |
| Butter flavor | oz | 10 |
| Gum (locust bean) | lbs | 2¼ |
| Salt | lb | 1 |

7. A base material for making frozen confections, said base material being capable of floating on water and being in the form of a solid, aerated slab comprising the following ingredients in the following relative proportions:

| Ingredient | Unit | Amount |
|---|---|---|
| Hydrogenated cocoanut oil | lbs | 63 |
| Plain cottonseed oil (highly refined, bland) | lbs | 63 |
| Propyl 3,4,5-trihydroxy benzoate | oz | 1¼ |
| Sugar | lbs | 100 |
| Gum (locust bean) | lbs | 2¼ |

8. A method of making a base material for the preparation of frozen confections which comprises heating and mixing together an edible oil, sugar, propyl 3,4,5-trihydroxy benzoate, and locust bean gum, whipping the heated mixture to form a firm paste having therein a large quantity of air in the form of very finely divided, uniformly dispersed bubbles, and cooling said paste to form a solid, aerated slab which will float on water and which may be conveniently handled in the distribution of said base material.

JACOB R. KATZ.

References Cited in the file of this patent

UNITED STATES PATENTS

| Number | Name | Date |
|---|---|---|
| 1,935,596 | Fear | Nov. 14, 1933 |
| 2,007,218 | Seltzer | July 9, 1935 |
| 2,065,398 | Roth et al. | Dec. 22, 1936 |
| 2,097,229 | Lucas et al. | Oct. 26, 1937 |
| 2,255,191 | Sabalitschka | Sept. 9, 1941 |
| 2,279,205 | Parsons et al. | Apr. 7, 1942 |
| 2,433,276 | Hipple et al. | Dec. 23, 1947 |
| 2,619,422 | Diamond | Nov. 25, 1952 |